Aug. 19, 1952     F. M. SAIGH, JR     2,607,463
COIN-CONTROLLED VENDING MACHINE
Filed March 6, 1947     10 Sheets-Sheet 1
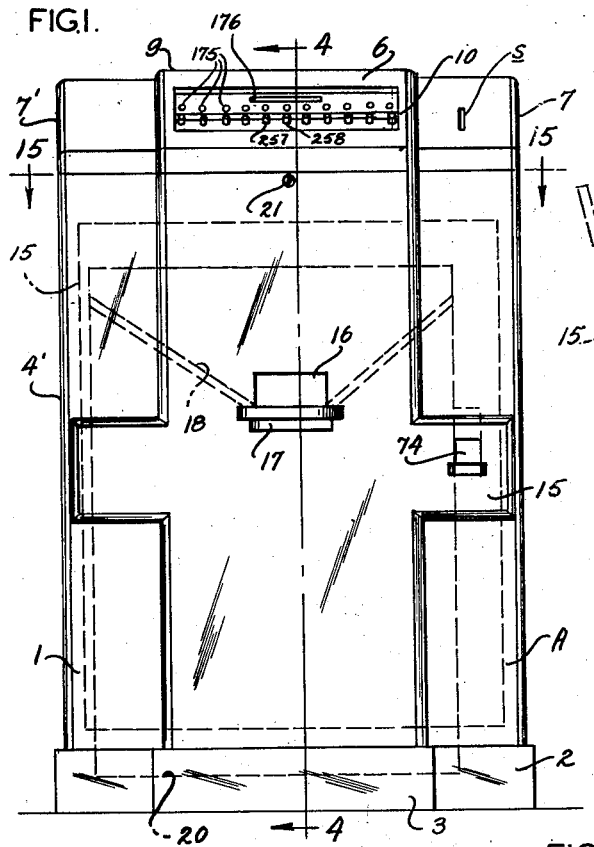
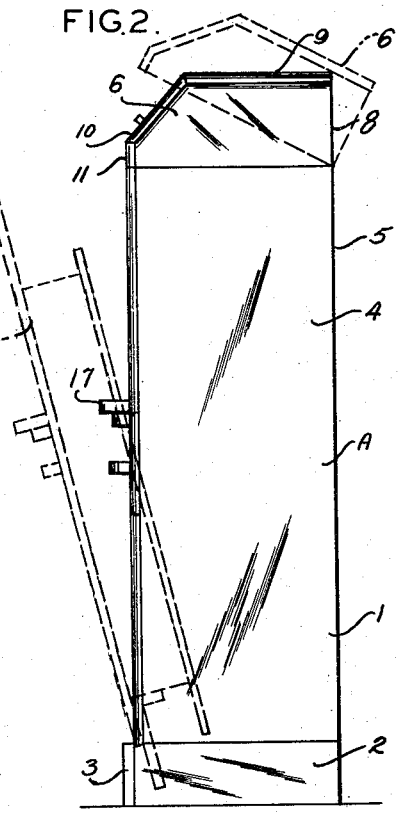
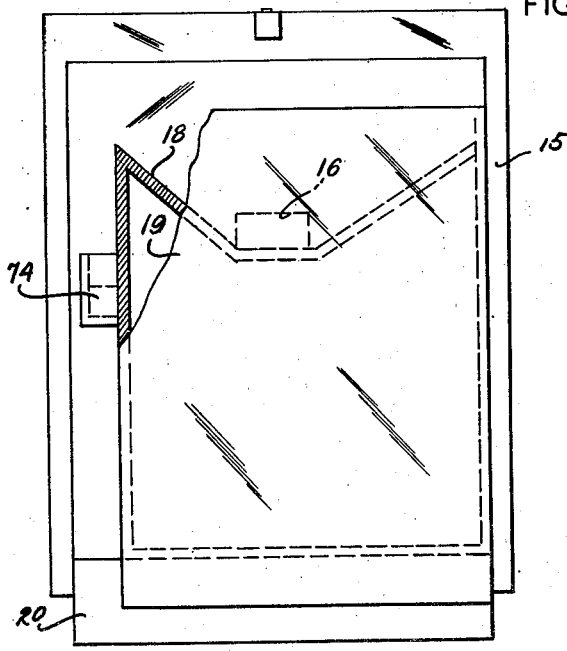
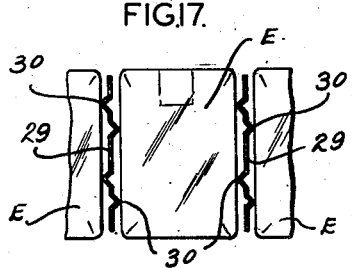
INVENTOR:
FRED M. SAIGH JR.
BY
ATTORNEY.

Aug. 19, 1952     F. M. SAIGH, JR     2,607,463
COIN-CONTROLLED VENDING MACHINE
Filed March 6, 1947     10 Sheets-Sheet 2
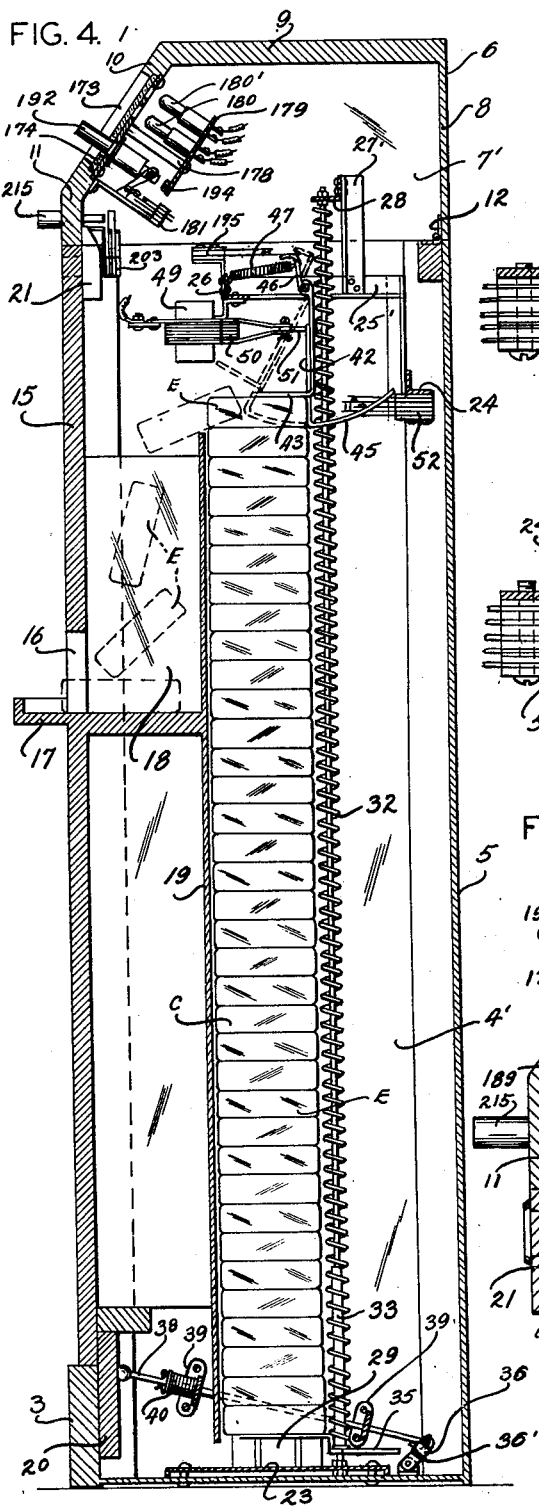
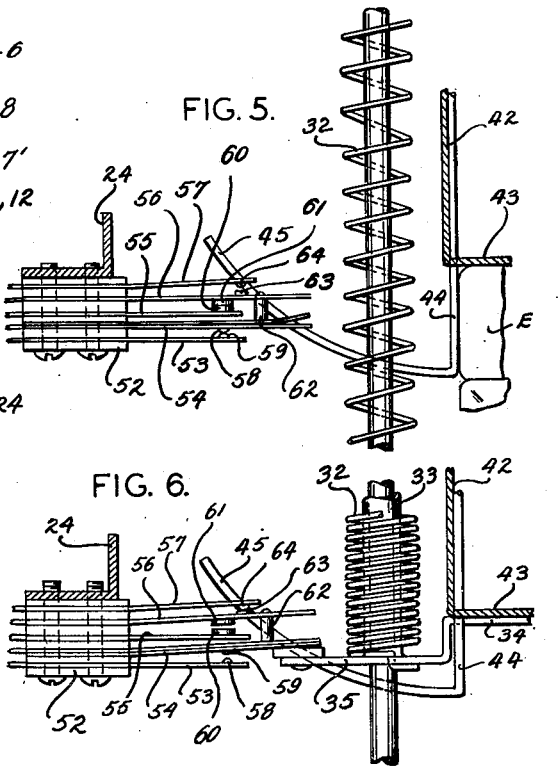
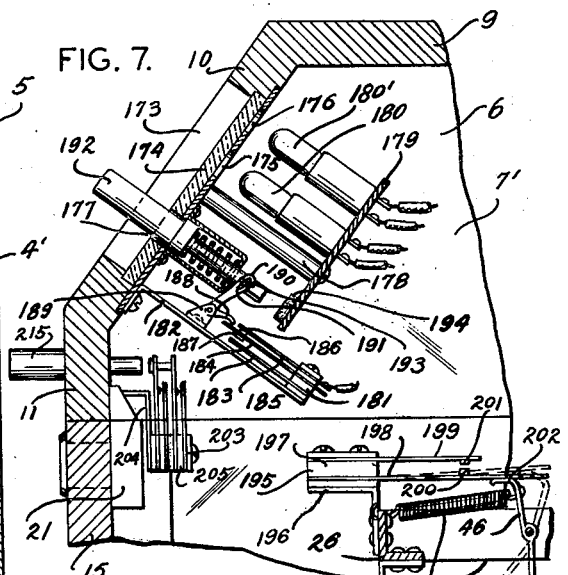
INVENTOR:
FRED M. SAIGH JR.
BY Alfred W Petchaft
ATTORNEY.

Aug. 19, 1952  F. M. SAIGH, JR  2,607,463
COIN-CONTROLLED VENDING MACHINE
Filed March 6, 1947  10 Sheets-Sheet 3
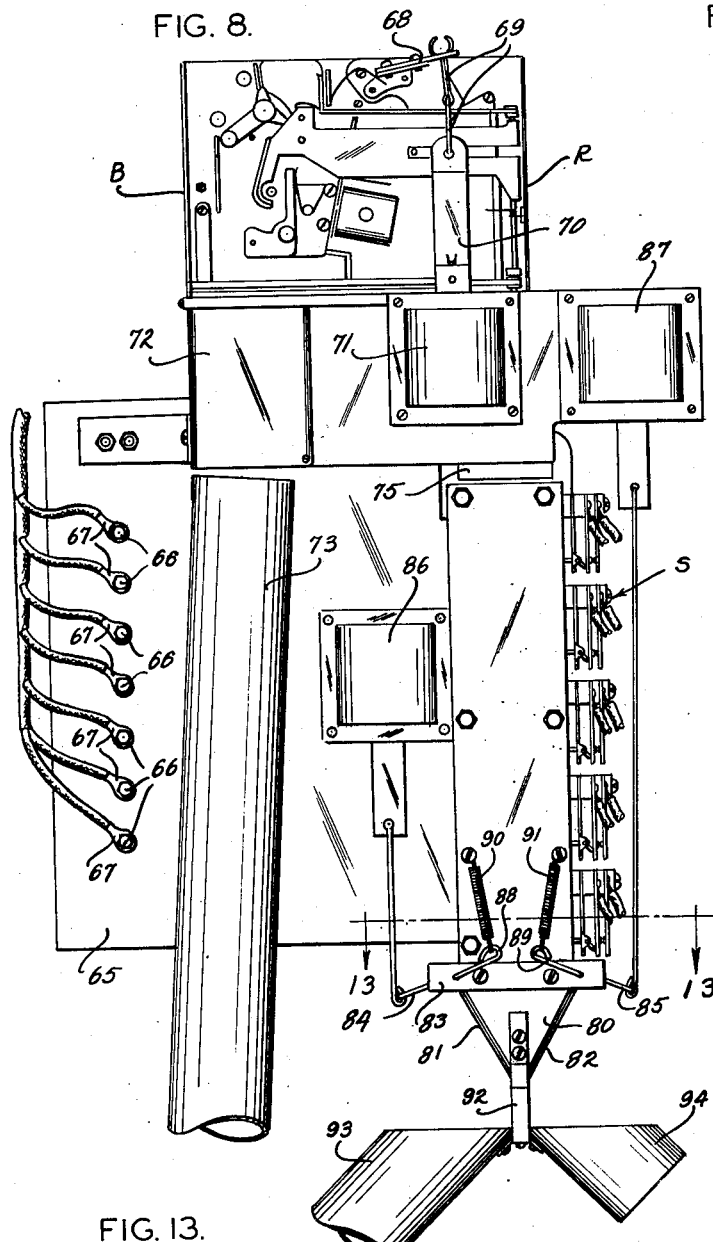
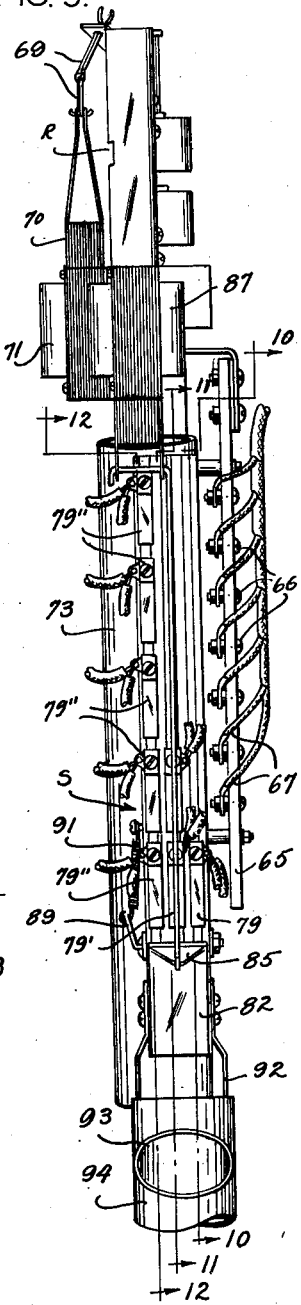
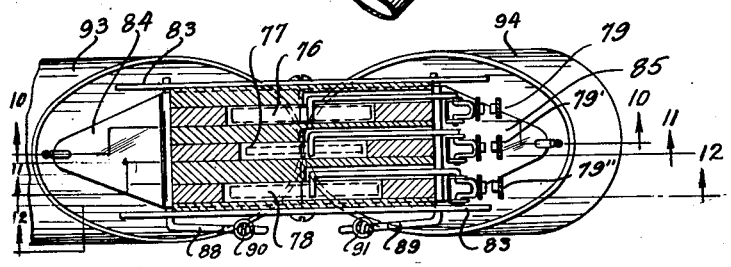
INVENTOR:
FRED M. SAIGH JR.
BY *Alfred W Petchaft*
ATTORNEY.

Aug. 19, 1952     F. M. SAIGH, JR     2,607,463
COIN-CONTROLLED VENDING MACHINE
Filed March 6, 1947     10 Sheets-Sheet 4
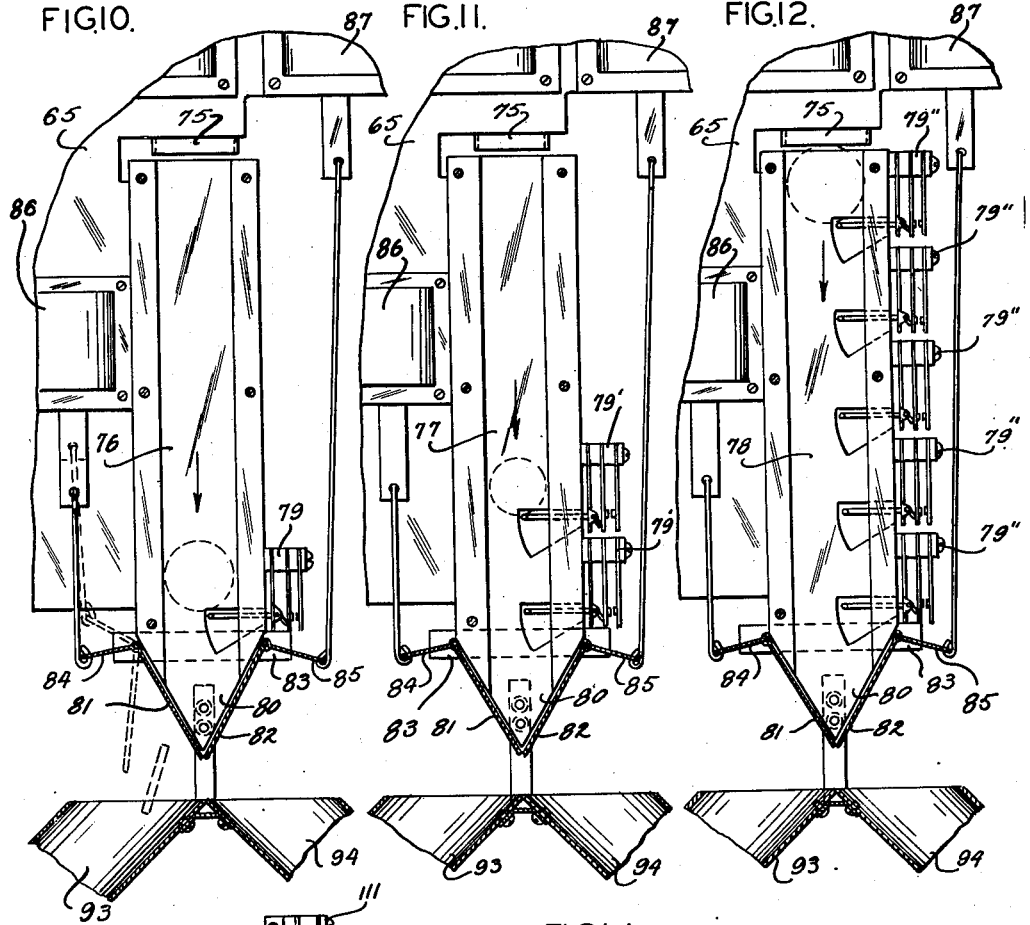
INVENTOR:
FRED M. SAIGH JR.
BY Alfred W. Petchaft
ATTORNEY.

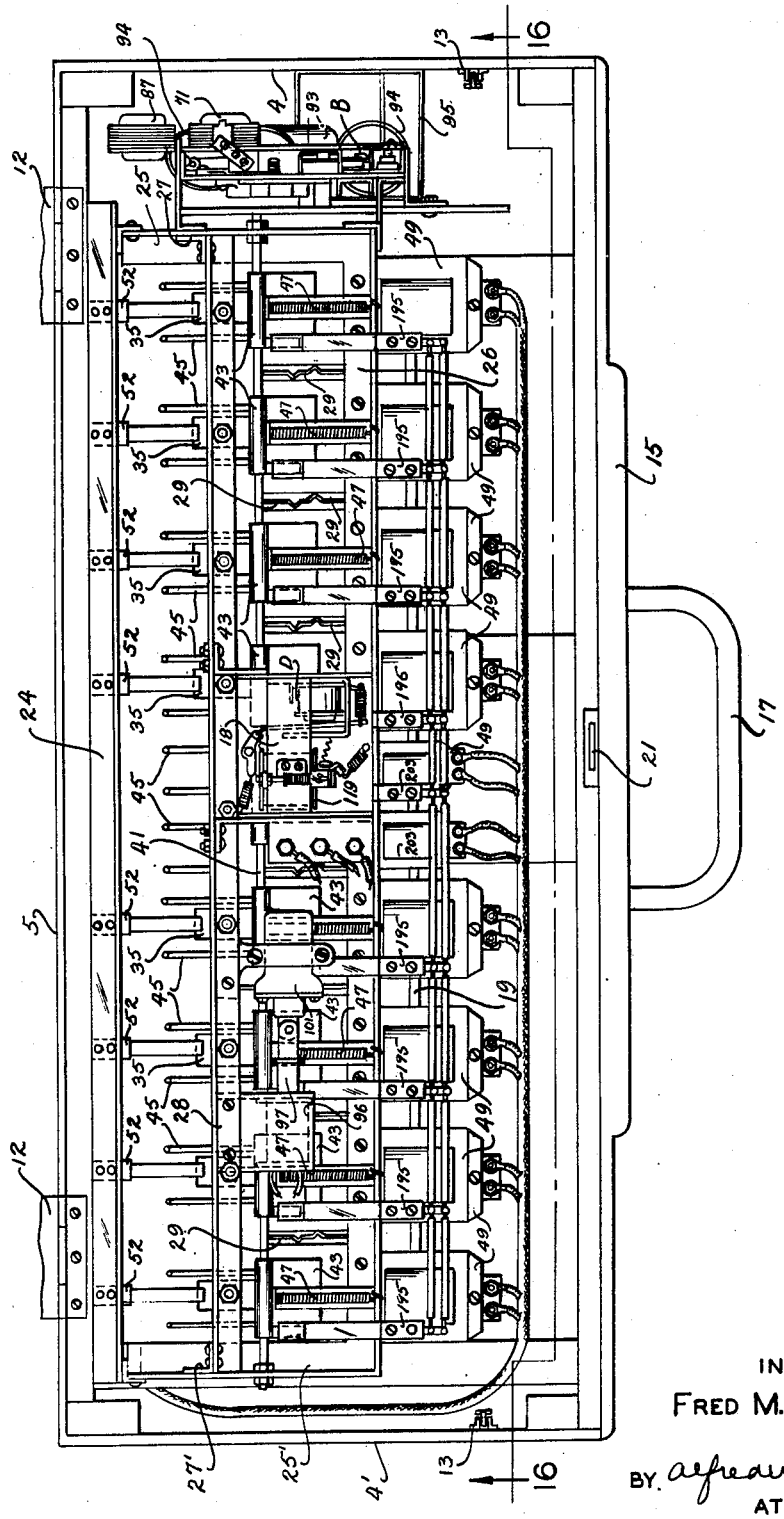

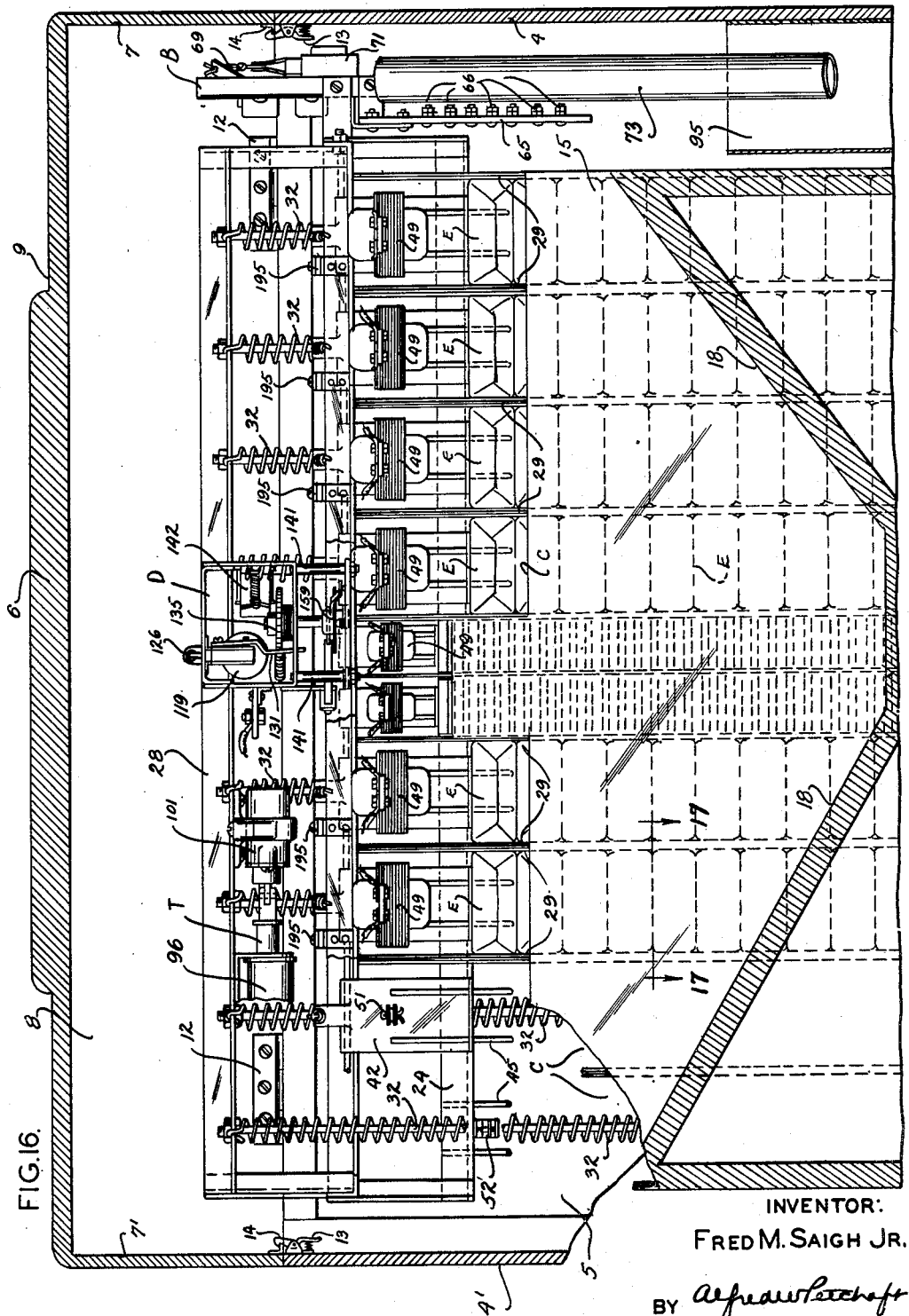

Aug. 19, 1952     F. M. SAIGH, JR     2,607,463
COIN-CONTROLLED VENDING MACHINE
Filed March 6, 1947     10 Sheets-Sheet 7

INVENTOR:
FRED M. SAIGH JR.
BY *Alfred W. Petchaft*
ATTORNEY.

Aug. 19, 1952      F. M. SAIGH, JR      2,607,463
COIN-CONTROLLED VENDING MACHINE
Filed March 6, 1947      10 Sheets-Sheet 8

INVENTOR:
FRED M. SAIGH JR.
BY *Alfred W Petchaft*
ATTORNEY.

Aug. 19, 1952  F. M. SAIGH, JR  2,607,463
COIN-CONTROLLED VENDING MACHINE
Filed March 6, 1947  10 Sheets-Sheet 9

INVENTOR
FRED M. SAIGH JR.
BY Alfred W Petchaft
ATTORNEY.

Aug. 19, 1952  F. M. SAIGH, JR  2,607,463
COIN-CONTROLLED VENDING MACHINE
Filed March 6, 1947  10 Sheets-Sheet 10
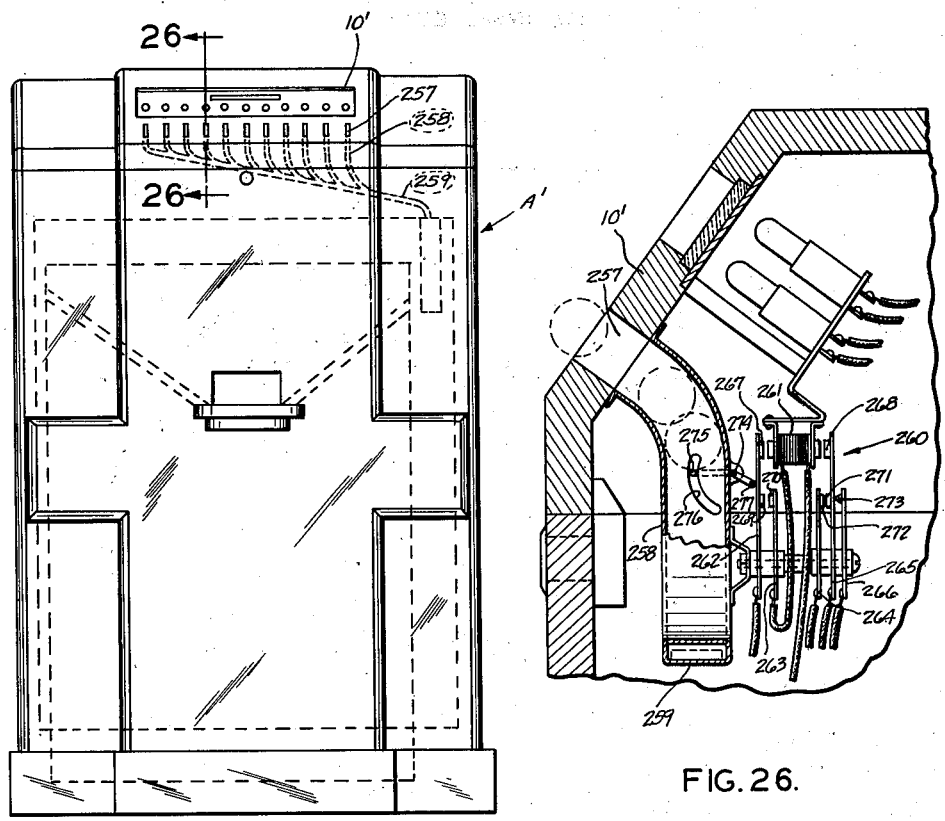
FIG. 25.
FIG. 26.
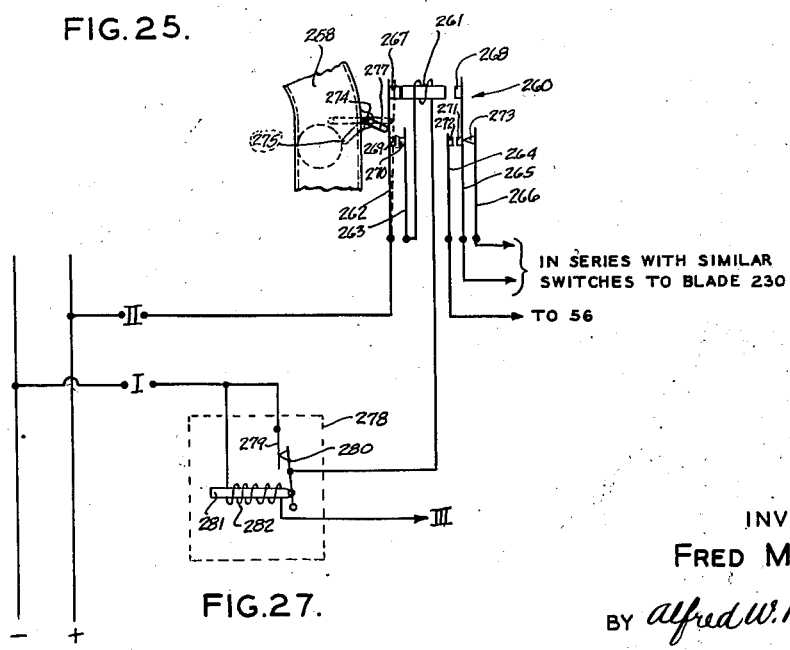
FIG. 27.
INVENTOR
FRED M. SAIGH JR.
BY Alfred W. Petchaft
ATTORNEY Patented Aug. 19, 1952

2,607,463

UNITED STATES PATENT OFFICE 2,607,463

COIN-CONTROLLED VENDING MACHINE

Fred M. Saigh, Jr., St. Louis, Mo.

Application March 6, 1947, Serial No. 732,670

2 Claims. (Cl. 194—10)

This invention relates in general to certain new and useful improvements in coin-controlled vending machines.

It is the primary object of this invention to provide a coin-controlled vending machine which will not retain the purchaser's money under any circumstances except upon delivery of desired and selected merchandise.

It is another object of the present invention to provide a coin-controlled vending machine which will deliver any one of several different types or kinds of merchandise subject to the selection of the purchaser and make such delivery from a single delivery opening in such a manner as will prevent unauthorized persons from fraudulently or otherwise removing merchandise from the machine without making proper payment therefor.

It is a further object of the present invention to provide a vending machine of the type stated which is fully electric in operation and contains a complete system of interconnected safety controls to prevent malfunctioning and to insure that the purchaser's money will be returned in the event of abnormal or erroneous operation or mechanical breakdown.

It is likewise an object of the present invention to provide a vending machine of the type stated which will automatically reject the purchaser's money if an amount is deposited in the machine which does not bear a proper or predetermined relationship to the price of the merchandise selected.

It is also an object of the present invention to provide a vending machine of the type stated which will automatically give a visible indication when selected merchandise is not available for delivery in response to actuation of the machine.

It is also an object of the present invention to provide a machine of the type stated which is capable of dispensing merchandise in several different price categories and will automatically indicate the price categories in which the machine will deliver merchandise responsive to a particular amount of money which has been deposited in the machine, so that the purchaser will know what different kinds of merchandise he may buy for the particular amount of money deposited and, contrariwise, will also know what other types of merchadise available in the machine will not be delivered because the funds deposited are yet inadequate to meet the price.

And with the above and other objects in view, my invention resides in the novel features of form, construction, arrangement, and combination of parts presently described and pointed out in the claims.

In the accompanying drawings (ten sheets)—

Figure 1 is a front elevational view of a coin-controlled vending machine constructed in accordance with and embodying my present invention;

Figure 2 is a side elevational view of the coin-controlled vending machine.

Figure 3 is a rear elevational view, partly broken away and in section, of the front panel of the machine;

Figure 4 is a vertical sectional view taken along the line 4—4 of Figure 1;

Figures 5 and 6 are enlarged fragmentary detail views of the merchandise delivery mechanism;

Figure 7 is a detail sectional view of the merchandise selecting and cash switch mechanisms forming a part of the present invention;

Figures 8 and 9 are enlarged fragmentary detail views of the coin-selecting and recording mechanism.

Figure 18:
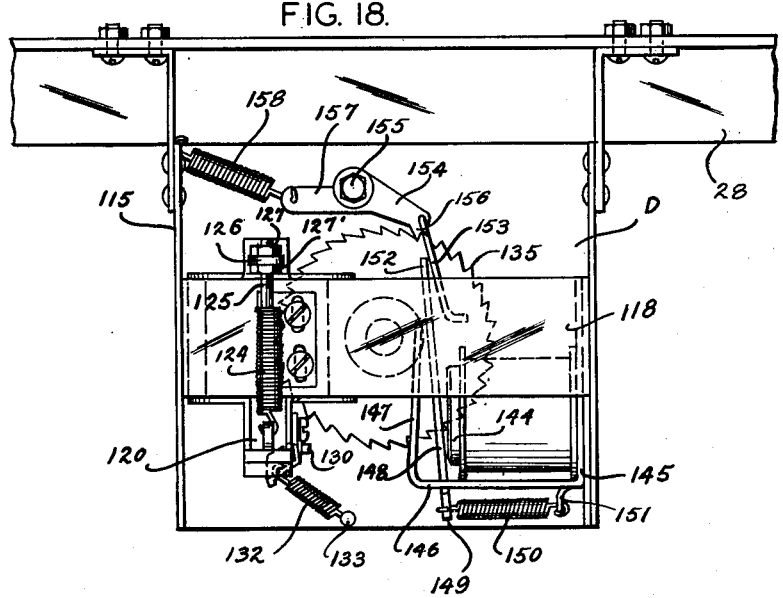
Figure 19:
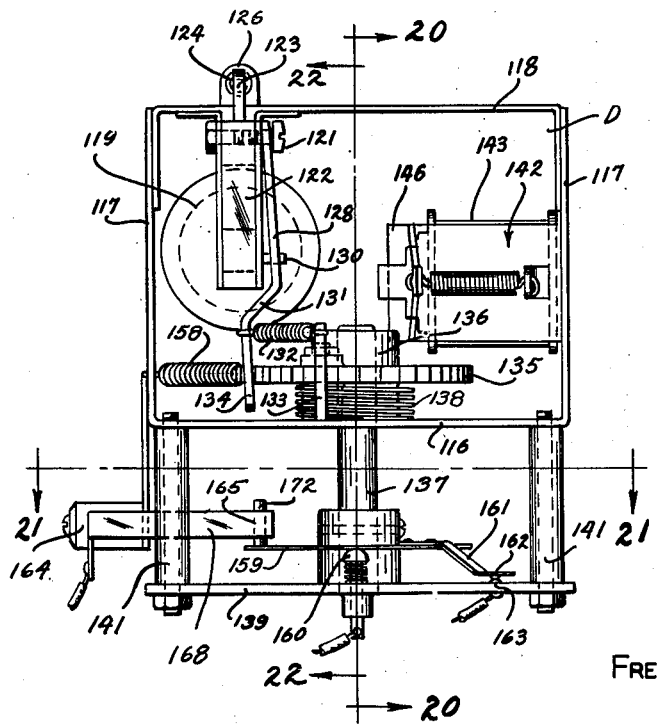
Figure 24:
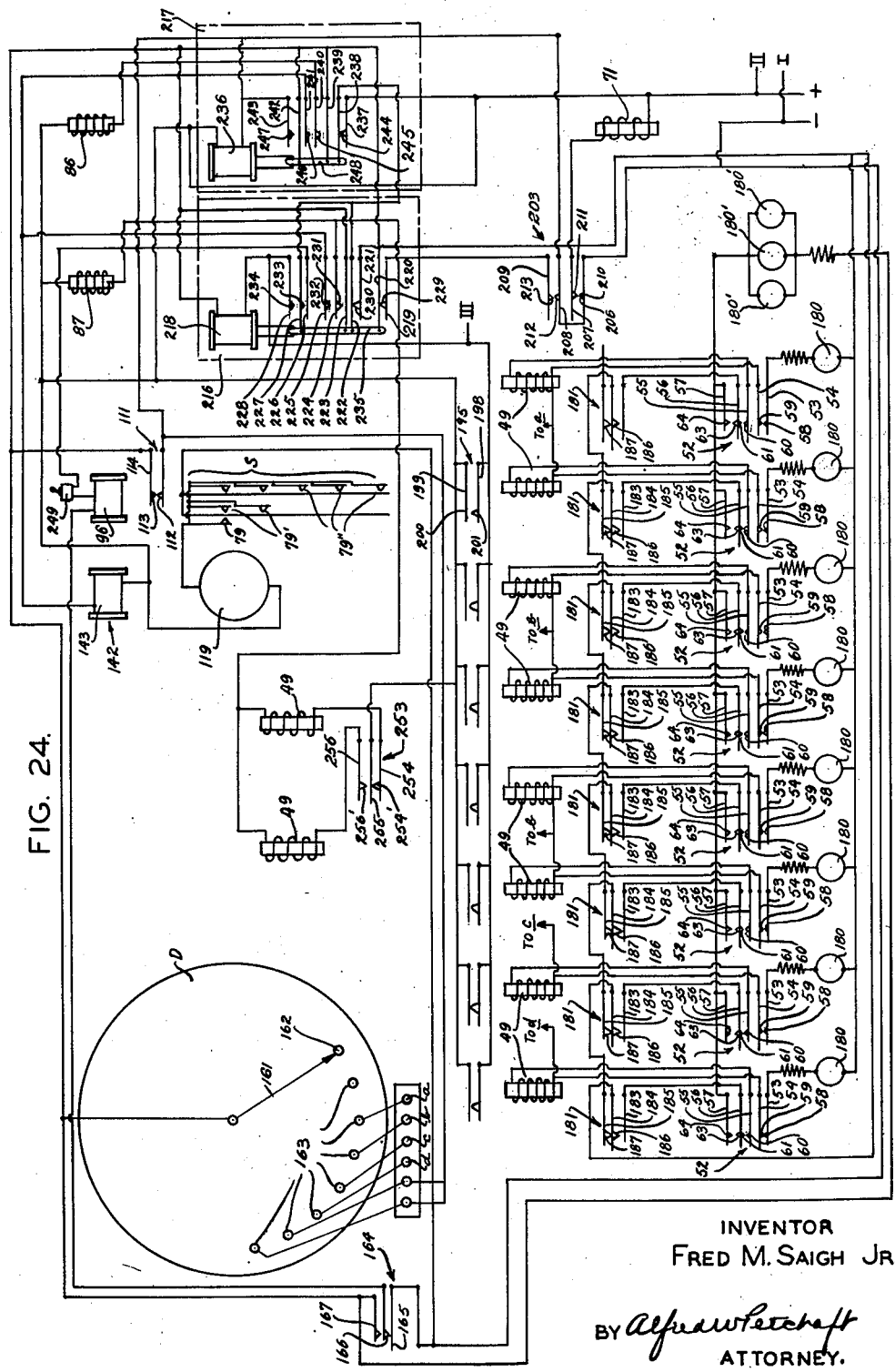

Figures 10, 11 and 12 are fragmentary sectional views of the coin-selecting and recording mechanism taken respectively along lines 10—10, 11—11, and 12—12 of Figure 9;

Figure 13 is a fragmentary sectional view of the coin-selecting and recording mechanism taken along the line 13—13, of Figure 8;

Figure 14 is an enlarged detail view of the time delay switch forming a part of the present invention;

Figure 15 is a horizontal sectional view taken along the line 15—15 of Figure 1;

Figure 16 is a vertical sectional view taken along the line 16—16 of Figure 15;

Figure 17 is a fragmentary horizontal sectional view taken along the line 17—17 of Figure 16;

Figure 18 is a detail plan view of the cash recording mechanism forming a part of the present invention;

Figure 19 is a detail elevational view of the cash recording mechanism forming a part of the present invention;

Figures 20, 21 and 22 are sectional views taken respectively along lines 20—20, 21—21, and 22—22 of Figure 19;

Figure 23 is an enlarged detail view illustrating the operation of the ratchet of the cash recording mechanism;

Figure 24 is a schematic wiring diagram illustrating the various circuits embodied in the vending machine of the present invention;

Figure 25 is a front elevational view of a modified form of vending machine;

Figure 26 is a fragmentary sectional view taken along the line 26—26 of Figure 25; and Figure 27 is a schematic wiring diagram showing the modified electrical connections employed in the embodiment illustrated in Figures 25 and 26.

Referring now in more detail and by reference characters to the drawings, which illustrate a preferred embodiment of the present invention, A designates an outer housing or case comprising a main or base shell 1, which, in turn, consists of a rectangular bottom wall 2, a short front apron board 3, two spaced parallel side walls 4, 4', and a back wall 5. The side walls 4, 4', and back wall 5 terminate at their upper margins in the same plane for tight fitting engagement with the downwardly presented margins of a top section 6 which comprises two spaced parallel side walls 7, 7', a rear wall 8, a top wall 9, and an obliquely disposed front panel 10, which extends forwardly and downwardly for a distance somewhat short of the total height of the top section 6 and at its lower margin is joined to a narrow transversely extending front wall 11. Along its lower margin, the rear wall 8 is secured by means of hinges 12 to the upper margin of the back wall 5, so that the top section 6 may be swung upwardly, as shown in dotted lines in Figure 2.

The side walls 4, 4', are provided upon their inner faces with manually operable spring catches 13 adapted for engagement with suitable detents 14, which are, in turn, fixed upon the inner faces of the side walls 7, 7', so that the top 6 will normally be held firmly in closed position. Provided for removable closure-forming disposition in the opening defined by the forward vertical edges of the side walls 4, 4', the lower edge of the front wall 11 of the top section 6, and the upper edge of the front apron board 3, is a panel 15 having a centrally disposed delivery aperture 16 and a forwardly projecting delivery shelf or till 17. Upon its rear face, the panel 15 is provided with a delivery chute 18 and a vertical backing board 19, the latter extending downwardly almost to the bottom wall 2 and upwardly to a point just above the upper edge of the chute 18. Along its lower margin, the panel 15 is provided with a downwardly projecting extension 20 adapted to slip in behind the apron board 3 and hold the lower margin of the panel 15 in snug-fitting disposition upon the upper edge of the apron board 3. Upon its rear face and adjacent its upper margin, the panel 15 is provided with a lock 21 by which it may be secured in place to prevent unauthorized access to the interior of the case A.

It will be noted in this connection that the spring catches 13 are so located so as to be entirely inaccessible when the panel 15 is locked in place and the entire housing or case A is thus securely closed in a theft-proof manner.

Riveted or otherwise suitably secured upon the upper face of the bottom wall 2, is a base plate 23, and similarly mounted upon the inner faces of the side walls 4, 4', and back wall 5, is a skeleton framework or chassis formed of interconnected angle iron and channel-shaped structural members, including a rear cross bar 24, side bars 25, 25', a forward cross bar 26, vertical posts 27, 27', and an upper cross bar 28.

Welded or otherwise suitably secured at their upper and lower margins respectively to the forward cross-bar 26 and the base plate 23 and extending vertically upwardly therebetween is a spaced series of pressed metal partitions 29 having a plurality of vertical corrugations 30 arranged so that the apices of the corrugations on one face of any selected partition 29 will be directly aligned with, and opposite to, the apices upon the opposing face of the next adjacent partition 29 in such a manner as to form slideways for the packages of merchandise disposed therebetween. The partitions 29 project forwardly to a point just rearward of the backing board 19 and thus form a series of so-called merchandise compartments C, each of which is substantially similar to all others. It will, of course, be understood that these compartments may be of different dimensions to accommodate different sizes or kinds of merchandise where so desired. For example, the preferred embodiment herein being described includes two central compartments sized to accommodate match-books flanked on either side by four compartments sized to accommodate cigarette packages, making a total of eight such cigarette compartments.

Secured at its lower and upper ends respectively, the base plate 23 and the cross bar 28, rearwardly of each compartment C, and equidistantly from each two compartment-defining partitions 29, is vertical rod 31, provided with a long external or encircling spiral spring 32, attached at its upper end to the upper cross bar 28 and at its lower end to a tubular quill or sliding sleeve 33. Rigidly secured to the lower end of each sleeve 33 is a forwardly extending horizontal elevator plate 34 dimensioned for loose fitting disposition within the associated compartment C and having a rearwardly projecting latching finger 35 for engagement with a snap latch-member 36, one such latch-member for each compartment being mounted on a horizontally extending latch bar 36', fixed at its ends in a pair of rocker arms 37 which are, in turn, pivotally mounted upon the inner faces of the side walls 4, 4' respectively. Swingably mounted in and projecting forwardly from the rocker arms 37, are actuating link rods 38 which extend slidably through supporting brackets 39 on the inner faces of the side walls 4, 4', adapted for impinging engagement at their opposite or free ends against the rear face of the panel-extension 20 and being normally urged forwardly by compression springs 40, all as best seen in Figure 4 and for purposes more fully appearing.

Rigidly mounted at its ends in, and extending horizontally between, the side bars 25, 25', is a pivot rod 41, and swingably mounted upon the pivot rod 41, between each pair of partitions 29, is a depending kicker 42 provided at its lower end with a forwardly projecting horizontal stop plate 43 normally disposed in superposed parallel relation to the elevator plate 34. Welded, soldered, or otherwise rigidly secured to the back face of the kicker 42 and projecting downwardly therefrom is a pair of rodlike delivery arms 44, each provided at its lower extremity with an integral rearwardly and upwardly bent hold-down member 45, the latter being bent on a circular arc, the radius of which is equal to the distance between the center of the pivot rod 41 and the under face of the hold-down plate 43 plus the thickness of a single merchandise package, so that, when a stack of merchandise is placed upon the elevator plate 34, as shown in Figure 4, the upper and rearwardly presented faces of the uppermost packages will respectively rest against the under faces of the stop plate 43 and the projecting portion of the delivery arms 44. Thus when the kicker 42 swings forwardly only the uppermost package will be propelled over the upper edge of the backing board 19 and will thence fall freely downwardly through the chute 18 and through the opening 16 into the till 17 for removal by the purchaser.

The upper end of the kicker 42 is provided with a finger 46 which projects upwardly beyond the pivot rod 41 and is suitably apertured for receiving one hooked end of a tension spring 47, the other hooked end of which is secured in the upwardly projecting flange 48 of the forward cross bar 26 for normally urging the kicker 42 into rearward position. Also mounted on, and depending from, the under face of the forward cross bar 26 approximately midway between each of the partitions 29, is a merchandise delivery solenoid 49 having a horizontally reciprocating plunger 50 which projects rearwardly and is connected by means of a flexible link 51 to the kicker 42 and is adapted when energized to swing the kicker 42 forwardly to the position shown in dotted lines in Figure 4 to effect delivery of the uppermost package of merchandise. It will be noted that, as the kicker 42 is swung forwardly, the hold-down member 45 will engage the top face of the next succeeding package and hold the column or stack of merchandise packages stationary while the uppermost merchandise package is being delivered or discharged into the chute 18. When the solenoid 49 is de-energized after having discharged a merchandise package, the kicker 42 will be swung rearwardly under influence of the spring 47 and as soon as the hold-down members 45 have cleared the rear edge of the merchandise package with which they are engaged, the column or stack of packages will be free to move upwardly into engagement with the under face of the hold-down plate 43 and the entire column or stack of merchandise packages will be urged upwardly by the elevator plate 34 and the spring 32 into abutment with the stop plate 43.

Mounted upon the rear cross bar 24 centrally and to the rear of each compartment C, is a limit switch 52 having five spaced parallel contact blades 53, 54, 55, 56, and 57, the blades 54 and 56 being substantially longer than and projecting outwardly beyond, the others. The blades 53 and 54 are provided upon their facing surfaces with opposed contact buttons 58, 59 and the blade 55 is provided on its upper face with a contact button 60 positioned for engagement with an opposed contact button 61 mounted upon the underside of the blade 56, the latter being also provided upon the under face of its projecting end with a somewhat longer contact button 62 adapted for engagement with the upper face of the projecting end of the blade 54. Finally, the upper face of the blade 56 is provided with a contact button 63 for engagement with an opposed contact button 64 mounted upon the under face of the blade 57. The projecting end of the blade 54 of each limit switch 52 is disposed in the path of the latching finger 35 of the elevator plate 34 associated with its particular compartment C, so that when such elevator plate 34 reaches the upper limit of its travel and that particular compartment C of the machine is empty, the blade 54 will be shifted upwardly breaking the contact between the switch points 58, 59, making contact with the switch point 62, shifting the latter upwardly to flex the blade 56 and thereby break contact between the switch points 60, 61, and at the same time, make contact between the switch points 63, 64, all as best seen in Figure 6 and for purposes presently more fully appearing.

Removably mounted upon, and supported from the side bar 25, is a coin deposit mechanism B which is assembled, for convenient removal and replacement, upon a dielectric plate or panel 65, the latter having a plurality of binding posts 66 for receiving conventional wire fastening lugs 67 by which the coin deposit mechanism may be connected to the various circuits in the machine in the manner presently to be described. Secured upon the face of and projecting upwardly from the panel 65 is a coin rejector R (Figures 8, 9) which may be of any conventional design or construction adapted to receive coins from a coin depositing slot s formed in the oblique panel 10 of the top section 6. The coin rejector R also is conventionally provided with an outwardly projecting actuating lever 68 connected by means of flexible links 69 to a plunger 70 of a scavenger solenoid 71, and depending from the coin rejector R is a scavenger chute 72 which, in turn, opens downwardly into a scavenger-return tube 73, the latter extending downwardly and opening into a coin return till 74 located upon and projecting outwardly from the panel 15. Also depending from the coin rejector R is a coin discharge chute 75 which conventionally consists of three channels adapted respectively to receive nickels, dimes, and quarters, as they pass out of the selector mechanism which forms a conventional part of the coin rejector R.

Mounted upon the panel 65 directly beneath the chute 75 is a coin actuated sensing mechanism S having three preferably vertical chutes or channels 76, 77, and 78 respectively, disposed beneath the three channels of the coin chute 75 for receiving nickels, dimes, and quarters which drop therefrom. Disposed within and extending across the channel 76 is a single switch element 79 adapted to make contact once each time a nickel falls down through the chute 76. Similarly, the channel 77 is provided with two switch elements arranged in vertically successive order so as to make two separate and successively timed contacts when a dime drops downwardly through the channel 77. Finally, the channel 78 is provided with five vertically spaced switch elements 79'' arranged to make five separate and successively timed contacts as a quarter drops downwardly through the channel 78. It will also be noted by reference to Figures 10 to 13, inclusive, that these several contacts just above described are spacially arranged in reference to each other so that there is no possibility of causing two contacts to take place simultaneously and thus record the amount of the coins inaccurately. Even if two coins should happen to be moving downwardly through two of the channels at the same time, the contacts and resulting electrical impulses caused thereby would not occur exactly at the same instant and therefore would not obscure each other. If, for example, a nickel and a dime were deposited into the machine, the two coins would fall through the sensing mechanism S and would create a total of three separate contacts resulting in three distinct electrical impulses. Similarly, if a quarter and a dime were to pass through the sensing mechanism S at the same time they would produce seven separate and successive contacts which would, in turn, result in seven separate and distinct electrical impulses.

At its lower end the sensing mechanism S is provided with downwardly pointed triangular side walls 80 and oppositely swinging gates 81, 82, which rest against and extend transversely between the inclined margins of the side walls 80 and are pivoted between cross bars 83. Each of the gates 81, 82 is provided with outwardly extending actuating arms 84, 85 which are respectively connected to a coin return solenoid 86 and a coin depositing solenoid 87. The gates 81, 82 are also provided with outwardly projecting arms 88, 89 which are connected at their outer ends to tension spring 90, 91 adapted normally to hold the gates 81, 82 in closed position. Thus, the gate 81, acting in conjunction with the arms 84, 88, the spring 90 and relay 86, forms a coin-return means or refunding means, as it may be called. Suspended by means of a bracket 92 from the triangular side walls 80 are a pair of oppositely diverging chutes 93, 94, the chute 93 extending forwardly and opening to the coin return till 74 and the chute 94 extending rearwardly and opening to a coin deposit box 95 in which the coins are held for collection by the owner or operator of the machine.

Mounted upon the under face of the upper cross bar 28 is a time delay switch mechanism generally designated T and consisting of an actuating solenoid 96 having a reciprocating plunger 97, one end of which projects horizontally outwardly and is integrally provided with a diametrically enlarged stop collar 98. Outwardly of the collar 98, the plunger 97, is axially kerfed or milled out to provide a yoke slot 99 and opposed parallel ears 100. The time delay mechanism T also includes a cylinder 101 disposed in co-axial alignment with the axis of the solenoid plunger 97 and provided in its one end wall with a conventional check valve 102. Working reciprocably within the cylinder 101 is a piston 103 having a plunger rod 104 projecting outwardly through a collar 105 and extending at its outer end within the slot 99 and secured therein by means of a cotter pin 106. Coiled around the plunger rod 104 interiorly of the cylinder 101 is a plunger spring 107 abutting at one end against the outer face of the piston 103 and at its other end against the inner face of the collar 105 so as to normally urge the piston 103 inwardly in the direction of the check valve 102. The collar 105 is provided with a small vent aperture 108 which is large enough to permit ready exhaustion of the air within the cylinder as the piston 103 is moved backwardly against the action of the spring 107 and the check valve 102 is set in such a manner as to allow air to enter the cylinder behind the piston 103 freely, but to restrict the discharge of air from the piston 103 as the piston is forced back to its original position under influence of the spring 107, and thereby effect a predetermined time delay. The solenoid plunger 97 projects outwardly from the solenoid 96 and is provided with a dielectric lug 109 which impinges against the projecting end of a spring blade 110 forming part of an automatic refund switch 111. Inwardly of its free end, the blade 110 is provided with a contact button 112 for circuit-making engagement with a contact button 113 mounted in a shorter spring blade 114. It should be noted in this connection that the lug 109 and blade 110 are so located in reference to the path of travel of the plunger 97 that the switch 111 will be closed several seconds before the plunger returns to its initial or "de-energized" position, all as best seen in Figure 14.

Also mounted on the upper cross bar 28 is a coin recording, circuit-routing distributor, D, comprising a U-shaped skeleton frame 115 having a horizontal base plate 116 and upwardly extending side plates 117. Flanged over at its opposite ends, and secured to the upper ends of side plates 117, is a cross plate 118 for supporting, upon its under face, an electromagnet 119 having an enclosing frame 120 and a pole piece 120' projecting outwardly from an end thereof. Swingably mounted upon the frame 120 by means of a pivot stud 121 is a leaf type armature 122 provided at its upper end with an extension arm 123 for engagement in one end of a tension spring 124 secured at its other end upon a tension adjusting stud 125 which projects through an upstanding eye 126 formed upon the upper face of the cross plate 118. Threaded upon the projecting end of the stud 125 for adjustably fixing it lengthwise with respect to the eye 126 is an adjustment nut 127, and lock nut 127'. Rockably and swingably mounted upon the pivot stud 121 is an actuating arm 128 provided intermediate its ends with an elongated aperture 129 for loose fitting engagement with a pin 130 fixed in and projecting outwardly from the armature 122. Below the aperture 129 the actuating arm 128 is provided with an offset bend 131, and below the latter is apertured for engagement with one hooked end of a tension spring 132 which is in turn hooked at its other end around an upstanding post 133 mounted in the frame plate 116, outwardly from, and to one side of, the armature 122, so that its axis will extend at a substantial angle to the path of movement of the armature 122 and thereby urge the actuating arm 128 laterally outwardly from the side face of the armature 122. Below the offset bend 131, the actuating arm is provided with a downward extension 134 terminating just above the frame plate 116 and adapted upon forward movement of the armature 122, for edgewise engagement with one of the teeth of a ratchet wheel 135 which is formed with an integral hub portion 136 bearing upon its downwardly presented end face, against the upper face of the frame plate 116, and being pinned to the upper end of a vertical shaft 137, journaled in and extending downwardly through the frame plate 116. And disposed encirclingly around the lower portion of the hub 136 is a spiral spring 138 secured at its lower end to the frame plate 116 and at its upper end to the ratchet wheel 135. At its lower end the shaft 137 is in turn also journaled in a dielectric terminal plate 139 which is secured in downwardly spaced relationship beneath the frame plate 116 by means of a plurality of threaded studs 140 and spacer sleeves 141.

Mounted upon one of the side plates 117 and projecting inwardly over the ratchet wheel 135, is a resetting mechanism 142 comprising a magnetic coil 143 and a stationary pole piece 144 secured within a frame 145 which is in turn provided with an outwardly projecting, preferably integral, tongue portion 146 having an integral stop arm 147 bent over approximately at right angles to the tongue portion 146 and extending across, and in outwardly spaced relationship to, the pole piece 144. Swingably mounted upon the tongue 146 and extending between the pole piece 144 and the stop arm 147 is an armature plate 148 projecting at one end, as at 149, beyond the tongue 146 for engagement with one end of a tension spring 150 which is in turn, at its other end, connected to an ear 151 struck up from the magnet-frame 145, for normally urging the armature 148 outwardly away from the pole piece 144 and against the stop arm 147. At its other end, as at 152, the armature bears against an actuating bar 153 mounted rigidly in and extending from a pawl 154 pivoted at its mid-portion upon an upstanding stud 155 mounted in the frame plate 116. The pawl 154 is provided at one end with a tongue 156 suitably shaped for engagement in the interdental spaces of the ratchet wheel 135, and at its other end is provided with an outwardly extending arm 157 apertured for receiving one hooked end of a tension spring 158 which is in turn, at its other end, suitably fastened to the side plate 117 for normally urging the pawl into retentive engagement with one of the teeth of the ratchet wheel 135.

It will be apparent that as the actuating solenoid 119 is energized, the armature 122 and its associated actuating arm 128 will be swung inwardly toward the pole piece 120' of the coil 119 so that the downward extension 134 thereof will move from the position shown in full lines to the position shown in dotted lines in Figure 23, advancing the ratchet wheel by a distance of one tooth, so to speak. Because the actuating arm 128 is more or less loosely mounted upon the stud 121 and is free to rock laterally, it will swing slightly toward the armature 122 along the pin 130 during this advancing movement so as not to bind the tooth of the ratchet wheel 135. When the current energizing the coil 119 is interrupted, the armature 122 will be released and the actuating arm 128 will be pulled backwardly into original position for engagement with the next successive tooth of the ratchet wheel 135. It will thus be evident that each time the coil 119 is energized the ratchet wheel 135 will be advanced a single tooth or step. Furthermore, it will be evident that as the ratchet wheel 135 is advanced the spring 138 will be placed under increasing tension and will tend to return the ratchet wheel to its original position but such return movement is prevented by the pawl 154.

When the coil 143 is energized, the armature plate 148 will be swung inwardly against the pole piece 144 and the extended end 152 of the arm 149 will bear against and swing the actuating bar 153 of the pawl 154 outwardly, disengaging the pawl from, and thereby releasing, the ratchet 135 which will thereupon be returned to initial position under influence of the spring 138.

Pinned to the lower end of the shaft 137 is a conductive disc 159 bearing upon its under face against a spring pressed conductor button 160 which is mounted in the dielectric terminal plate 139. Secured to, and extending outwardly from the conductive disc 159 is a conductor arm 161 which is bent downwardly and terminates in a contactor shoe 162 which sweeps over a series of contact buttons 163 mounted in a spaced series upon the upper face of the dielectric terminal plate 139 along an arc concentric with the shaft 137. It should be noted in this connection that the several buttons 163 are so spaced from each other that the contactor shoe 162 will move successively from one such button 163 to the next adjacent button 163, as the ratchet wheel 135 progresses step by step.

Suitably mounted upon the terminal plate 139, adjacent one of the outer edges thereof, is a zero position switch 164 having three spaced parallel leaf spring switch blades 165, 166 and 167. The blades 165 and 167 are respectively provided, upon their inwardly presented faces, with contact points 168, 169 and the intermediate blade 166 is provided upon its opposite faces with contact points 170, 171 for respective contactive engagement with the contact points 168, 169. The blade 165, furthermore, is prolonged and extends over the edge of the disc 159 for engagement with an upstanding dielectric pin 172 mounted in the upper face of the disc 159 adjacent the outer peripheral margin thereof. The pin 172 is so positioned in relation to the arm 161 that when the latter is in zero position, that is to say, in contact with the first in the series of contact buttons 163, the pin 172 will impinge against the prolonged end of the blade 165 flexing it backwardly and shifting the contact button 168 out of engagement with the contact button 170, and accordingly releasing the intermediate blade 166 from flexure, in which unflexed position, it will assume a position such that its contact button 171 is out of contacting engagement with the contact button 169 of the switch blade 167, all as best seen in Figure 21. When, however, the disc 159 rotates in a clockwise direction (reference being had to Figure 21), the pin 172 will move away from the prolonged end of the blade 165. As a result the contact button 168 will come into circuit-completing engagement with the contact button 170 and upon continued movement of the pin 172, the blade 166 will also be flexed so that the contact button will be brought into circuit-completing contact with contact button 169.

The obliquely disposed front panel 10 of the top section 6 is provided centrally with an elongated preferably rectangular opening 173 closed by a transparent panel 174 formed of glass, plastic, or other suitable material, and surface coated to render it entirely opaque except for a plurality of circular areas or windows 175 arranged in a uniformly spaced horizontal series and a single oblong rectangular area or window 176 preferably located above and midway of the series of circular areas 175. The panel 174 is finally provided, directly beneath each of the circular transparent areas or windows 175, with a small aperture 177, all as best seen in Figure 7 and for purposes presently more fully appearing.

Mounted upon and extending outwardly from the rear face of the panel 10 on either side of the opening 173 are support arms 178 transversely connected at their outer ends by a horizontal cross bar 179, and secured thereon behind each of the windows 175 is a small incandescent lamp 180. Also mounted upon the cross bar 179, and disposed behind the oblong rectangular window 176, are three parallel-connected "nogoods" indicator lamps 180'. Rigidly mounted upon and extending inwardly from the rear face of the front panel 10 beneath, and aligned with, each of the apertures 177, is a push button switch 181 comprising a main supporting arm 182 and three spaced parallel flexible switch blades 183, 184, and 185. The blade 185 is provided upon its inner face with a contact point 186 normally in contactive engagement with the opposed face of the switch blade 184 and the latter is in turn provided upon its other face with a contact point 187 normally spaced from, and out of contact with, the switch blade 183. The switch blade 184 projects, at its free end, outwardly beyond the switch blades 183, 185 for engagement with a switch actuating arm 188 swingably mounted upon an ear 189 struck up from the main supporting arm 182. The actuating arm 188 is rigidly connected to, and actuated by, a rock arm 190 provided adjacent its outer or free end with an elongated slot 191. Shiftably mounted in and extending longitudinally through each of the apertures 177 is a rod-like push button 192 fabricated preferably of dielectric material and provided adjacent its inner end with a horizontal projecting pin 193 extending through and working in the rock-arm slot 191 and mounted upon the opposed face of the cross plate 179 directly behind each of the push buttons 192 is an abutment disc 194 formed of sponge rubber or other suitable shock absorbing material, and being of sufficient thickness so as to engage the inner end of the push button 192 just before it has reached the desired inner limit of its travel, thereby acting as a movement-limiting stop therefor.

Mounted on and depending from the upper cross bar 28 above each compartment C is a cash switch 195 associated with such compartment and comprising a main or frame plate 196 and a dielectric end block 197 in which are mounted two spaced parallel flexible switch blades 198, 199 respectively provided upon their adjacent faces with opposed contact points 200, 201 and adapted normally to be disengaged or out of contact with each other. The lowermost blade 198 projects outwardly at its free end and overlies a cam-like actuating arm 202 formed integrally with and as an upward extension of the kicker 42. The cam-like actuating arm 202 is disposed at a selected oblique angle such that when the kicker 42 is in inactive position, the switch blade 198 will be unflexed and the contact points 200, 201 will be out of contact with each other. When the kicker 42 is shifted forwardly under influence of its associated merchandise delivery solenoid 49, the actuating arm 202 will swing rearwardly and upwardly flexing the blade 198 and bringing the contact 200 into engagement with the contact 201, all as best seen in Figure 7 and for purposes presently more fully appearing.

Also mounted at any convenient location in the panel 174 is a refund switch 203 comprising a frame member 204 and dielectric block 205 provided with four spaced parallel switch blades 206, 207, 208, and 209 as best seen in Figure 7. The blades 206 and 207 are respectively provided upon their adjacent faces with opposed contact buttons 210, 211 and similarly the blades 208 and 209 are respectively provided with opposed contact buttons 212, 213. The blades 206, 208 furthermore extend outwardly and at their extended ends are mechanically connected by a dielectric link 214 and are arranged for actuation by the spring pressed push button 215, the latter being so arranged that, when it is shifted inwardly by the customer, the switch blades 206 and 208 will be flexed and the pairs of contact points 210, 211 and 212, 213 are brought into circuit closing or contactive engagement.

Also mounted at any suitable location within the case or housing A is a cash relay 216 comprising an actuating coil or solenoid 218 and ten spaced parallel stationary switch blades 219, 220, 221, 222, 223, 224, 225, 226, 227, and 228. The blade 219 is provided with a contact point 229 normally positioned for circuit-closed engagement with the blade 220. Similarly, the blade 221 is provided with a contact point 230 for circuit-closed engagement with the blade 222. The blade 224 is provided with a contact point 231 adapted for engagement with the blade 223 when the latter is flexed and the blade 225 is provided with contact point 232 for engagement with the blade 224 when the latter is flexed as a result of continued flexure of the blade 222. The blade 227 is provided with a contact point 233 for circuit-closed engagement with the blade 226 and the blade 228 is provided with a contact point 234 for engagement with the blade 227 when the latter is flexed and thereby shifted out of engagement with the blade 226. The blades 220, 222, 223 and 227 are interconnected by a dielectric link 235 which is, in turn, mechanically connected in any suitable or conventional manner to the solenoid 218 for actuation thereby, all as schematically shown in Figure 24.

Similarly mounted at any suitable location within the case or housing A, is a refund relay 217 comprising an actuating solenoid 236 and seven spaced parallel switch blades 237, 238, 239, 240, 241, 242, and 243. The blade 237 is provided with a contact point 244 for circuit-closed engagement with the blade 238. The blade 240 is provided with a contact point 245 adapted for engagement with the blade 239 when the latter is flexed and the blade 241 is provided with a contact point 246 for engagement with the blade 240 when the latter is flexed upon flexing of the blade 239 after it comes in contact with the contact point 245. The blade 243 is provided with a contact point 247 for engagement with the blade 242 when the latter is flexed. The blades 238, 239 and 242 are connected by a dielectric link 248 which is, in turn, connected in any suitable or conventional manner to the solenoid 236 for actuation thereby.

Located beneath the plunger 97 of the time-delay mechanism T is a conventional single-pole, single throw toggle-switch 249 having an upwardly extending arm 250 disposed between two depending lugs 251, 252 rigidly mounted on the plunger 97 in axially spaced relation to each other as best seen in Figure 14. The lugs 251, 252 are furthermore so located with reference to the path of movement of the plunger 97 that one lug, 251, will engage and shift the arm 250 to "off" position just as the plunger 97 reaches the outer limit of the path of travel through which it is moved by the solenoid 96 when the latter is energized and the other lug 252 will engage and reversely shift the arm 250 to "on" position just as the plunger reaches the opposite limit of its path of travel or so-called "de-energized" position. As has been above pointed out, the lug 110 and its associated refund switch 111 are so located in relation to the de-energized position of the plunger 97 that the switch 111 is closed several seconds prior to the instant at which the plunger 97 comes to rest in such de-energized position. Consequently, the toggle-switch 249 is shifted into "on" position substantially later in time after the switch 111 has been closed.

The two match-holding compartments are not associated with push button switch 181 or limit switch 52 as are the cigarette containing compartments C. Instead, one of the match-holding compartments C is associated with a change-over switch 253 mounted upon the rear cross bar 24 and accommodating three switch blades 254, 255, and 256. The intermediate or middle blade 255 projects outwardly beyond the others for engagement with the latching finger 34 of the particular elevator plate 35 associated with such match-holding compartments C. The blades 254 and 256 are respectively provided upon their inner faces with contact buttons 254', 256', for alternative contact with the intermediate switch blade 255. When such match compartment C is filled with matches, the switch blade 255 will be in contact with the contact button 254' of the blade 254, and, when the compartment is empty, the associated latching finger 34 will lift the switch blade 255 into contact with the contact button 256' of the switch blade 256, at the same time breaking contact with the contact button 257 of the switch blade 254. The switch blades 254, 256, are respectively connected to the two delivery solenoids 49, with the matchbook-holding compartments, and it will, therefore, be evident that the change-over switch 253 operates to effect a change-over between the two columns when the supply of matchbooks in one column has become exhausted.

It will be understood that the present machine may be designed for vending almost any kind of merchandise capable of being enclosed within a conventionally sized package by varying the number, size, and shape of the compartments C. As has been above stated, however, the preferred embodiment herein being described has been designed for vending packages of cigarettes and books of matches from its several compartments C. Furthermore, for purposes of illustration, it may be assumed that the first two cigarette compartments C, counting from right to left (reference being had to Figure 16), are filled each with a selected brand of ten-cent cigarettes, the next four compartments each being respectively filled with selected brands of fifteen-cent cigarettes, the next compartment being filled with a selected brand of twenty-cent cigarettes, and the last compartment with a selected brand of twenty-five cent cigarettes. In reference to this last brand of cigarettes it may be stated that it has been arbitrarily assumed that the owner of the vending machine will desire to include a twenty-five cent brand and that such a brand is available on the market inasmuch as it facilitates the explanation of the operation of the machine to assume the presence in the machine of a merchandise package or unit having a sales value of twenty-five cents. Obviously, with very slight and inconsequential changes, the machine can be adapted for vending only merchandise packages having a sales value of fifteen cents, or any other combination or range of price.

The vending machine is loaded or filled with cigarette packages by unlocking and removing the panel 15, whereupon the actuating link rods 38 will be released and will shift forwardly under influence of the compression springs 40, thus permitting the latch bar 36' to shift into operative position. The elevator plates 34 may be manually shifted downwardly against the tension of their respective springs 32 until the latching fingers 35 thereof engage with its associated snap latch mechanism 36 on the latch bar 36' and is thus held down for convenience in loading or filling. When each compartment C has been filled from bottom to top with cigarette packages, the panel 15 may again be returned to closure-forming position and locked in place, and, as this is done, the link rods 38 will again be shifted rearwardly, swinging the latch bar 36' out of operative position and disengaging the latching fingers 35 of the elevator plates 34 from the snap latch members 36. Each elevator plate 34, upon being released, applies upward pressure to the bottom of the stack of cigarette packages within the particular compartment C with which such elevator plate 34 is associated and consequently the uppermost cigarette package in the stack will be forced upwardly against the stop plate 43 of the kicker 42 of such compartment C.

The electrical interconnection of the various component elements of the vending machine is schematically shown in the wiring diagram, Figure 24, and the operation of the machine will best be understood by reference thereto. When money is dropped through the coin-depositing slot s, it will drop through the coin selector R and, if genuine, will drop thence into the coin sensing mechanism S. It will, of course, be understood by those familiar with this type of machinery that the coin selector R will operate so as to distinguish between coins of various denominations. Nickels, dimes, and quarters will be respectively deposited into the nickel, dime, and quarter chutes or slots of the sensing mechanism S and will accordingly produce one, two, or five discrete electrical impulses during passage downwardly therethrough. The impulses are fed directly to the electromagnet 119, which is thus intermittently energized and advances the contactor shoe 162 step by step over the several contact buttons 163. It will be evident that, when a nickel drops through the sensing mechanism S, the shoe 162 will be shifted into contact with the first contact button 163. If a dime is deposited in the machine, the shoe will be shifted into contact with the second contact button 163. If a quarter is deposited, the contact shoe 162 will be shifted into contact with the fifth contact button 163. If both a nickel and a dime are deposited in the machine in successive order, the shoe 162 will be shifted over either one or two contact buttons, depending upon which coin is deposited first, and then will be shifted a further button or buttons until, as a result of the deposition of both coins, it has come to rest on the third contact button 163, representing the accumulation of fifteen cents in the machine. It will, of course, be obvious that, depending upon the number of contact buttons 163 which may be provided, the accumulated total of a number of successively deposited coins may be recorded. Inasmuch as both of the swinging gates 81, 82, are in closed position, the coins will be initially held in the triangular bottom portion of the sensing mechanism S.

The two merchandise delivery solenoids 49 associated with the first two compartments C are connected at one terminal to the second or "ten-cent" contact button 163 of the circuit routing distributor D, and the merchandise delivery solenoids 49 of the "fifteen-cent," "twenty-cent," and "twenty-five cent" compartments are similarly connected to the "fifteen-cent," "twenty-cent," and "twenty-five cent" buttons 163 of the circuit routing distributor D. All of the merchandise delivery solenoids 49 are furthermore connected across the switch blades 54, 55, of their associated limit switches 52. It will thus be evident that, as soon as a dime has been deposited in the vending machine and the contact shoe 162 of the circuit routing distributor D has been shifted into contactive engagement with the second or "ten-cent" contact button 163, both of the "ten-cent" merchandise delivery solenoids 49 will be connected with the circuit routing distributor D. It will also be evident that, as soon as a single electrical impulse is transmitted from the sensing mechanism S to the circuit routing distributor D, regardless of whether that impulse is the single impulse caused by a nickel, the first of two successive impulses caused by a dime, or the first of five successive impulses caused by a quarter, the conductor arm 161 will be swung around into contact with the first or so-called "five-cent" contact button 163. Because the particular embodiment presently being described is not set up to contain a column of five-cent merchandise, this "five-cent" contact button 163 will, in effect, be "dead" in the sense that it is not connected to any of the merchandise delivery solenoids 49. This initial movement of the contactor arm 161 shifts the pin 172 away from engagement with the arm 165 of the zero position switch 164, successively making contact with the switch blades 166 and 167.

The switch blade 166 is connected to one side of the time delay solenoid 96 and, inasmuch as the toggle switch 249 associated with the time delay mechanism T is in "on" position, the solenoid 96 will immediately be energized, shifting the plunger 97 over to its outer limit position, at which point the toggle switch 249 is shifted to "off" position, breaking the circuit to the solenoid 96 and deenergizing it. The plunger 97 thereupon is free to return to its initial position slowly under influence of the piston 103 and spring 107, which operate to introduce a selected interval of time delay in the return movement of the plunger 97. As the plunger 97 is shifted outwardly during the interval of energization of the solenoid 96, the automatic refund switch 111 is opened and this switch will remain open until the plunger 97 has returned almost to its initial position. In other words, the automatic refund switch 111 will remain open for a calculated interval of time, which is sufficiently long to permit the ordinary purchaser to complete his purchase. If, during this interval, the purchase is not completed, or some other unpredicted occurrence takes place to prevent normal functioning of the machine, the automatic refund switch 111 will, upon reclosing at the end of the interval, initiate a series of operations, as a result of which the unused coins will be returned to the purchaser and the entire machine shut down in a manner which will be presently more fully discussed.

The switch blade 167 of the zero position switch 164 is connected through the conductor button 160 and the conductive disc 159 to the conductor arm 161. Inasmuch as the switch blade 165 is connected to one main input lead (for convenience hereinafter designated as the negative lead), the contactor shoe 162 will now be live and when, upon receipt of the next impulses from the sensing mechanism S, the contactor shoe 162 moves into contactive engagement with the "ten-cent" contactor button 163, the two "ten-cent" merchandise delivery solenoids 49 will be conditioned for operation.

It will be noted that the negative terminal of the merchandise delivery solenoid 49 is also connected through the switch blades 53 and 54 to one terminal of the lamp 180 associated with that particular compartment C and the other terminal of such lamp 180 is connected in common with all the other similar lamps 180 through the switch blades 221, 222, of the cash relay 216 and thence through the switch blades 237, 238, of the refund relay 217 to the other main input lead (for convenience hereinafter designated as the positive lead). Consequently, as soon as a dime has passed through the sensing mechanism S and the two "ten-cent" merchandise delivery solenoids 49 have been conditioned for operation, the two incandescent lamps 180 associated with the two "ten-cent" merchandise compartments C will light up, indicating to the purchaser that he can now purchase merchandise from either of such "ten-cent" compartments. If the purchaser drops an additional nickel into the machine, making a total of fifteen cents deposited, the conductor arm 161 will move one step further, bringing the contactor shoe 162 into engagement with the third or "fifteen-cent" contactor button 163. The four merchandise delivery solenoids 49, associated with the four "fifteen-cent" compartments C, will thereupon be conditioned for operation and the corresponding four incandescent lights 180 will be lighted. At the same time, the two merchandise delivery solenoids 49, associated with the two "ten-cent" compartments C and the corresponding two lights 180, will go off, thereby indicating to the purchaser that fifteen-cent merchandise can be obtained. If the purchaser originally intended to purchase a fifteen-cent package of cigarettes and deposited fifteen cents in the machine, three impulses will be transmitted from the sensing mechanism S to the circuit routing distributor D in such rapid succession that the two lights 180 and the merchandise delivery solenoids 49 associated with the "ten-cent" compartment C will be "on" for only a fraction of an instant as the contactor shoe 162 passes over the "ten-cent" contactor button 163 and the purchaser will hardly be aware of this momentary or transitory condition. If, on the other hand, the purchaser originally deposited ten cents into the machine, intending to buy fifteen cent cigarettes and through error or for some other reason failed to deposit the additional nickel, the two lights 180 associated with the "ten-cent" columns will light up and the four lights 180 associated with the "fifteen-cent" columns will remain dark, indicating to the purchaser that only ten cents has thus far been deposited into the machine and thus only ten-cent merchandise can be bought. In such case, the purchaser, wanting fifteen-cent merchandise, can deposit an additional nickel, thereby putting the "fifteen-cent" compartments C in condition for operation. Similarly, if a purchaser has deposited a dime into the machine with the initial intention of purchasing ten-cent merchandise and changes his mind, he may, by the deposition of additional coins, condition for operation the higher price compartments C and accordingly purchase such higher price merchandise.

If, after the deposition of coins, the purchaser decides not to make any purchase at all, he may obtain a refund of his deposited coins by simply pressing the manual refund push button 215, closing the refund switch 203. The switch blade 208 is connected to one terminal of the refund relay 217 and the other switch blade 209 is connected through the switch blades 219, 220, of the cash relay 216 and thence through the zero position switch 164 to the negative lead. The other terminal of the solenoid 236 is connected directly to the positive lead. Therefore, as soon as the refund switch 203 is closed, the solenoid 236 will be energized and the refund relay 217 will be shifted into closed position. It will be noted that the switch blades 239 and 242 are also connected through the zero position switch 164 to the negative lead and the associated switch blades 240, 241, and 243 are respectively connected to one terminal of the coin return solenoid 86, one terminal of the magnetic coil 143 of the resetting mechanism 142, and to the negative side of the refund relay solenoid 236. The other terminals of the coin return solenoid 86 and the resetting mechanism coil 143 are connected in common directly to the positive lead. Therefore, upon actuation of the refund relay 217, the coin return solenoid 86 will become energized, opening the gate 81 and allowing the coins to drop out of the bottom sensing mechanism S into the return chute 93 and thence to the coin return till 74. At the same time, the resetting mechanism coil 143 is energized, whereby the ratchet mechanism of the circuit routing distributor D is released and the conductor arm 161 and its associated contactor shoe 162 are returned rapidly to zero position, opening the zero position switch and interrupting all circuits which are connected to the negative lead, thereby shutting down the machine completely. Because the purchaser may simply press the refund push button 215 and release it immediately before the machine has had time to clear itself, the contact between the switch blades 242 and 243 will operate as a holding circuit to maintain connection between the refund relay solenoid 236 and the negative lead until the zero position switch 164 is opened and the connection between the negative lead and all circuits is thus broken.

If the purchaser, on the other hand, desires to purchase merchandise for the coins deposited, assuming that he has deposited fifteen cents and the four "fifteen-cent" compartments C are accordingly conditioned for operation, the purchaser may press any desired one of the four push buttons 192 projecting outwardly through the apertures 177 of the panel 174 beneath the lighted lamps 180. As soon as the selected push button 192 is depressed, a circuit is closed to the switch blades 183, 184, which has the effect of connecting the associated merchandise delivery solenoid 49 through the switch blades 55, 56, to the positive lead, whereupon such solenoid 49, having already been conditioned by connection to the negative lead through the circuit routing distributor D, is energized and the kicker 42 is actuated to discharge a single package of cigarettes. As the kicker 42 is actuated, the associated cast switch 195 is closed, thereby completing a circuit to the particular solenoid 49 associated with the central match-holding compartment C for delivery of a single book of matches together with the dispensed cigarette package. The closing of the cash switch 195 simultaneously actuates one of the delivery solenoids 49 associated with one of the match-holding compartments C, depending upon which compartment contains a supply of matchbooks and such energized solenoid 49 will actuate its associated kicker 42 to deliver a book of matches with each dispensed package of cigarettes. At the same time, the cash switch 195 will close the circuit between one terminal of the cash relay solenoid 218 and the positive lead. The other terminal of the cash relay solenoid 218 is connected through the zero position switch 164 to the negative lead, and, since the zero position switch is closed due to the presence of cash in the machine, the cash relay solenoid 218 will be energized, closing the cash relay 216 and thereby simultaneously completing circuits to the coin depositing solenoid 87, the resetting mechanism coil 143, and a holding circuit for the cash relay solenoid 218. When the cash relay 216 closes, it automatically opens circuits to the refund relay 217, the incandescent lights 180, the push button switches 181, and the time delay solenoid 96. As a result, the coins are dropped through the chute 94 to a coin deposit box 95, the circuit routing distributor D is returned to zero position, and the lighted lamps 180 are turned off. As soon as the zero position switch 164 is opened, the holding circuit to the cash relay solenoid 218, together with all the other circuits of the machine, is broken and the entire machine returns to shutdown position.

If, for any reason, the purchaser does not make his selection within a reasonable length of time or for some other unforeseen reason the machine is not permitted to complete a full operating and merchandise delivery cycle, the time delay mechanism T will operate as a safety device. If coins are still in the machine and the conductor arm 162 of the circuit routing distributor D is in shifted position, so that the zero position switch 164 is closed when the plunger 97 approaches its initial or de-energized position, the automatic refund switch 111 will close and connect the refund relay to the negative lead with the same effect as though the refund push button 215 had been depressed. The machine will thereupon perform all of the operations which result from a closure of the refund relay 217, that is to say, the coins will be dropped into the coin return till 74, the resetting mechanism 142 will be actuated to return the conductor arm 161 of the circuit routing distributor D to zero position, and the zero position switch 164 will finally be opened to return the machine to shutdown condition. A short interval of time after closure of the automatic refund switch 111, the plunger 97 will finally return and come to rest in its initial or de-energized position, at which point the toggle switch 249 will be returned to closed position, thereby reconnecting the solenoid 96 to the positive lead. By this time, however, the zero position switch 164 has been opened and, therefore, the solenoid 96 will now be disconnected from the negative lead and not be energized, but will merely be conditioned for energization upon the next cycle of operation of the machine.

When any one of the compartments C becomes empty of its merchandise, the elevator plate 34 will come to rest at its uppermost position between the partitions 29 and the latch finger will engage the limit switch 52, disconnecting the circuits to the associated lamp 180 and delivery solenoid 49 and, at the same time, partially completing a circuit from one side of the three "no goods" indicator lamps 180' to the associated push button switch 181, so that, when such push button switch 181 is closed, the "no goods" indicator lamps 180' will immediately be lighted, warning the purchaser that the selected column containing the desired merchandise is empty. Because the limit switch 52 is open, however, the machine will remain inoperative, the indicator lamp 180 and the delivery solenoid 49, associated with that particular column will remain off, and the purchaser's money will remain in the bottom of the sensing mechanism S. Thus, it is possible for the purchase to obtain a refund of his money by pushing the refund button 215 or purchase an alternative brand of cigarettes by pressing any one of the other push button switches 181 within the price bracket corresponding to the amount of money deposited in the machine. In addition, if the purchaser does not desire to purchase any of the brands of cigarettes within the price bracket for which he has already deposited money, but prefers to purchase a brand of cigarettes in a higher price bracket, this result may be easily achieved by merely depositing additional coins until the machine contains an amount of cash corresponding to the particular price bracket from which the purchaser desires to make his second choice.

If, through error, accident, or for some other reason, slugs or defective coins find their way into the coin rejector R and the later becomes clogged, the spurious or defective coins and all other later deposited coins may be immediately returned to the cash return till 74 and the coin rejector R cleared for subsequent operations by pressing the refund push button 215, thereby closing the circuit through the switch blades 206, 207, to the scavenger solenoid 71. Inasmuch as no money has passed through the sensing mechanism S, the zero position switch 164 will be open and the alternative circuit from the refund switch 203 through the switch blades 208, 209, to the refund relay 217 will be inoperative. As will be evident from a consideration of the wiring diagram, the scavenger solenoid 71 is directly connected through the switch blades 206, 207, across the positive and negative leads, so that it will operate every time the refund push button 215 is depressed and will operate to clear the coin rejector R every time a refund is made, thereby defeating the efforts of any unscrupulous person who endeavors to "cheat the machine" by first depositing a genuine coin and thereafter depositing a spurious coin intended to jam the mechanism and permit actuation of the merchandise delivery units while at the same time allowing actuation of the refund mechanism to return the initially deposited genuine coin. The machine is additionally "cheat proof" because of the series connected relationship between the several pairs of switch blades 184, 185, of all of the push button switches 181. When any one push button 181 is actuated, the series circuit through the others is interrupted and, as a result, only one push button will initiate merchandise delivery operation in the machine.

Finally, if a purchaser should, through error, deposit thirty cents in the machine, the conductor arm 161 will be shifted around, bringing the contactor shoe 162 into contact with the sixth or "thirty-cent" contact button 163, and, similarly, if any amount in excess of thirty cents is deposited in the machine, the contactor shoe 162 will be accordingly shifted to some appropriate further contact button 163, representing such amount. Because, in the particular embodiment being here described, the highest price merchandise for which the machine is set up is a twenty-five cent package of cigarettes, all contact buttons 163 representing amounts of thirty cents or over will be connected in common to the negative side of the refund relay solenoid 235 and will operate in the same manner as the automatic refund switch 111. In other words, when an amount of thirty cents or over is deposited in the machine, the refund relay 217 will automatically be actuated and the money returned, thereby protecting the purchaser against loss of money by reason of accidental over-payment.

If desired, an entirely automatic vending machine may be provided including an outer housing or case A', substantially similar to the previously described case A except that the push buttons 192 are eliminated and instead the front panel 10' is provided with coin-drop slots 257, one for each merchandise compartment. Mounted behind each slot 257 are cam chutes 258 extending down into a common laterally extending cross-chute 259, which, in turn, discharges into the coin-deposit mechanism B.

Fixed upon the rear face of each chute 258, is a circuit-conditioning switch 260 each comprising a two-pole solenoid 261 and five spaced parallel switch leaves or blades 262, 263, 264, 265, 266, positioned at right angles to the axis of the solenoid 261. The blades 262 and 265 extend upwardly and are provided with pole-pieces 267, 268, respectively located in juxtaposition to the poles of the solenoid 261. The blade 262 is also provided with a contact point 269 positioned for contact with a contact point 270 on the blade 263 only when the blade 262 is flexed. Similarly, the blade 265 is provided with a contact point 271 for contact with a contact point 272 on the blade 264 only when the blade 265 is flexed. Finally, the blade 266 is provided with a contact point 273, which normally contacts the back side of the blade 265 when the later is unflexed.

Pivotally mounted on each chute 258 for cooperation with each switch 260, is a light-weight rock arm 274 provided at one end with a lateral finger 275 extending through an arcuate slot 276 formed in the side wall of the chute 258 and at the other end with a camming finger 277 for bearing against the blade 262. It will be evident that the blade 262 must be very flexible and capable of being actuated by the weight of a cam striking against the finger 275 of the rock arm 274. Provided for co-operation with all of the several circuit-conditioning switches 260, is a disconnect-relay 278 including a stationary contact blade 279 and a movable contact spring-leaf 280 set for normal closed contact engagement with the blade 279. Operably connected to the leaf 280 is a solenoid bar 281 mounted in and actuated by a solenoid 282, which, when energized, will shift the bar 281 outwardly to disconnect the blade 279 and leaf 280, thereby opening the normally closed circuit through such members. The switch 260 is connected as shown in Figure 27, the numerals I, II, III, being used to designate the points at which this modified or "overlaid" circuit is connected into the general circuits of the machine, as shown in Figure 24, the push button switches 181 and attendant mechanism being eliminated. Actually, the switch 260 is an automatic substitute for the manually operable delivery switch 181 of the previously described embodiment and the three blades 264, 265, 266, of the switch 260 correspond to the blades 183, 184, 185, respectively, of the switch being connected into the rest of the circuit in precisely the same manner and for the same purpose.

It will be noted by reference to Figure 24 that all of the switches 260 are connected to the negative lead through the normally closed disconnect relay 278. Thus, when a coin is dropped in one of the slots 257, the finger 275 will be tripped downwardly and the camming finger 277 will close the contact between blades 262 and 263, thus connecting the other side of the solenoid 261 to the positive lead and completing the circuit, thereby energizing the solenoid 261, which thereupon holds the blade 262 in circuit-closed position and also swings the blade 265 over into contact with blade 264 and out of contact with blade 266. This conditions the merchandise delivery circuit for operation as soon as the coins pass through the sensing mechanism S and the circuit-routing distributor D is activated. After the selected merchandise has been delivered and the associated cash switch 195 closed, current will travel (see connection III) to the solenoid 282 of the disconnect-relay 278 and the latter will be actuated momentarily, opening one side of the "holding" circuit to the solenoid 261. Thereupon, the blades 262 and 265 are released, returning the switch 260 to initial position.

It should be understood that changes and modifications in the form, construction, arrangement, and combination of the several parts of the vending machine may be made and substituted for those herein shown and described without departing from the nature and principle of my invention.

Having thus described my invention, what I claim and desire to secure by Letters Patent is:

1. A merchandise vending machine comprising a plurality of merchandise compartments, merchandise-delivery means, a solenoid operably associated with said delivery means, said solenoid having two terminals, manually operable switch means in series with one terminal of the solenoid for optionally setting in motion said delivery means, a coin-controlled circuit in series with the other terminal of the solenoid, solenoid actuated coin-return means, a time-delay switch in series with the solenoid actuated coin-return means for energizing said coin-return means at the end of a predetermined interval, means for receiving and holding coins during such interval, and means for interrupting the circuit between the time delay switch and the coin-refunding means responsive to operation of the manually operable switch means during such interval.

2. A merchandise vending machine comprising a plurality of merchandise compartments, merchandise-delivery means, a solenoid operably associated with said delivery means, said solenoid having two terminals, manually operable switch means in series with one terminal of the solenoid for optionally setting in motion said delivery means, a coin-controlled circuit in series with the other terminal of the solenoid, solenoid actuated coin-return means, a time-delay switch in series with the solenoid actuated coin-return means for energizing said coin-return means at the end of a predetermined interval, means for receiving and holding coins during such interval, means for interrupting the circuit between the time delay switch and the coin-refunding means responsive to operation of the manually operable switch means during such interval, and means for discharging the coins to the interior of the machine if the switch means is manipulated.

FRED M. SAIGH, Jr.

REFERENCES CITED

The following references are of record in the file of this patent:

UNITED STATES PATENTS

| Number | Name | Date |
| --- | --- | --- |
| 1,137,399 | Goodrun | Apr. 27, 1915 |
| 1,393,589 | Tuttle | Oct. 11, 1921 |
| 1,419,581 | Moriarity | June 13, 1922 |
| 1,635,451 | Zsoldos | July 12, 1927 |
| 1,747,387 | Paulson | Feb. 18, 1930 |
| 2,075,989 | Jonneret | Apr. 6, 1937 |
| 2,076,564 | Hoban | Apr. 13, 1937 |
| 2,253,674 | Andres | Aug. 26, 1941 |
| 2,271,397 | McDermott | Jan. 27, 1942 |
| 2,282,269 | Tone | May 5, 1942 |
| 2,354,896 | Weiler | Aug. 1, 1944 |
| 2,377,413 | Fry | June 5, 1945 |

FOREIGN PATENTS

| Number | Country | Date |
| --- | --- | --- |
| 15,164 | Australia | of 1933 |
| 354,418 | Great Britain | Aug. 13, 1931 |
| 375,264 | Great Britain | Dec. 24, 1930 |